(12) United States Patent
Garbo

(10) Patent No.: US 6,221,408 B1
(45) Date of Patent: Apr. 24, 2001

(54) PASTA COMPOSITES AND PROCESS THEREFOR

(76) Inventor: Paul W. Garbo, 48 Lester Ave., Freeport, NY (US) 11520

( * ) Notice: Subject to any disclaimer, the term of this patent is extended or adjusted under 35 U.S.C. 154(b) by 0 days.

(21) Appl. No.: 09/455,388

(22) Filed: Dec. 6, 1999

(51) Int. Cl.[7] .................................. A23L 1/16; A23P 1/08
(52) U.S. Cl. ........................... 426/94; 426/283; 426/451; 426/502; 426/516; 426/557
(58) Field of Search .............................. 426/516, 94, 283, 426/451, 502, 557

(56) References Cited

U.S. PATENT DOCUMENTS

| | | | | |
|---|---|---|---|---|
| 4,426,400 | * | 1/1984 | Newlin et al. | 426/282 |
| 5,283,071 | * | 2/1994 | Taylor et al. | 426/274 |
| 5,518,756 | * | 5/1996 | Dau | 426/659 |
| 5,939,113 | * | 8/1999 | Hursh | 426/94 |
| 5,960,705 | * | 10/1999 | D'Alterio et al. | 99/349 |
| 6,004,602 | * | 12/1999 | D'Alterio | 426/285 |
| 6,026,737 | * | 2/2000 | D'Alterio et al. | 99/346 |

\* cited by examiner

*Primary Examiner*—Nina Bhat
(74) *Attorney, Agent, or Firm*—Paul W. Garbo

(57) ABSTRACT

Pieces of cooked pasta are converted into unified masses by the use of edible, water-soluble cellulose derivatives as binding agents. For example, 2-inch pieces of cooked linguini are mixed with a viscous aqueous solution of hydroxypropyl methylcellulose to coat the linguini pieces. The admixed mass is baked to expel moisture and set the binder. Preferably, the admixed mass is compressed and baked under pressure to form a compact composite. By using a heated compression mold designed to form conventional pizza shells, cooked pieces of pasta and binder, any of several cellulose derivatives, are baked into a unified, pleasing alternative to dough-formed pizza shells.

23 Claims, No Drawings

PASTA COMPOSITES AND PROCESS THEREFOR

BACKGROUND OF THE INVENTION

This invention relates to pasta composites and more particularly, to such products that have a coherent or unified shape.

Illustrative of a unified product composed of pieces of cooked pasta bonded together is the pasta-based product of U.S. Pat. No. 5,411,752 to Taylor et al. The patent teaches the use of a binding agent "selected from the group consisting of (1) soy protein and (2) egg white compositions comprising a sufficient proportion of egg white to permit the adherence of the discrete pieces of cooked pasta by the baking step". The patent further advises the use of such binding agent "in a cooked pasta to binding agent weight ratio of from about 40:1 to about 10:1" which corresponds to a binder usage of from 2.5% to 10% based on the weight of cooked pasta. Even at the high level of 10% binder, the coherence of pasta pieces provided by egg white is not satisfactory for rapid production of pasta composites in a commercial scale operation. Moreover, the cost of such high usage of egg white limits the saleability of the pasta composites.

Accordingly, a principal object of this invention is to form composites of cooked pasta pieces with a strong binding agent.

Another important object is provide a binding agent that can be used in small proportions relative to cooked pasta to form composites with satisfactory coherence.

Other features and advantages of the invention will be apparent from the description which follows.

SUMMARY OF THE INVENTION

In accordance with this invention, the binding agent for holding pieces of cooked pasta together as unified masses of desired shape is an edible, water-soluble cellulose derivative that, when dissolved in water, yields a highly viscous solution. Examples of water-soluble cellulose derivatives are methylcellulose, hydroxypropyl methylcellulose, isopropyl cellulose, hydroxyethyl cellulose and carboxymethyl cellulose. Depending on the number of solubilizing radicals that are attached to the cellulose radical, the cellulose derivative will have a distinctive viscosity when dissolved in water. Thus, commercially available cellulose derivatives are sold in several grades.

A common grading of cellulose derivatives involves ASTM methods D2363/HPMC and D1347/MC of using a 2% aqueous solution of the cellulose derivative and Ubbelohde capillary tubes at 20° C. to determine the viscosity in centipoise units. The Dow Chemical Company is a prominent producer of methylcellulose and hydroxypropyl methylcellulose which are preferred binding agents for the pasta products of this invention. Dow Chemical offers food grades of both cellulose derivatives that are highly purified and used in many common foods such as soups, sauces, fried foods, cake fillings and icings; the grades of both derivatives that are especially beneficial in this invention are those having viscosities of 1500 centipoises or higher as determined by the aforesaid ASTM methods. On an equal weight basis, high viscosity grades of the cellulose derivatives tend to provide greater bonding strength between the pieces of cooked pasta that are compressed and baked into a unified food product. Therefore, a high viscosity grade generally permits usage in a lower proportion than is practical with a lower viscosity grade.

An important advantage of the invention is the variety of cellulose derivatives of various viscosity grades from which the producer of pasta composites can choose to achieve minimal production cost and/or to obtain pasta composites with enhanced qualities such as crispiness. Egg white is a single product with a single physical grade so that the formulator of pasta composites, prior to this invention, lacked the flexibility of varying formulas for economic reason or for modifying characteristics of pasta composites made possible with cellulose derivatives pursuant to this invention.

The effectiveness of cellulose derivatives as binding agents for pieces of cooked pasta was confirmed in a simple test wherein six strips of cooked, curly-edged lasagne (each uncooked strip measuring 2 inches by 5 inches) were laid on an aluminum sheet in the following arrangement. Two strips were placed side by side with their curly edges in contact with one another. A 2% water solution of hydroxypropyl methylcellulose (4000 centipoise grade) was brushed on the top side of the contiguous lasagne strips. Two more contiguous strips were laid on the first pair of strips but at right angles thereto. The second pair of contiguous strips was brushed with the aforesaid gum solution and a third pair of contiguous lasagne strips was placed on the second pair but at right angles thereto. An aluminum sheet was put on the triple lasagne layers and a weight of 10 pounds was placed on the top aluminum sheet.

The stack of lasagne layers sandwiched between the weighted aluminum sheets was put in a gas oven operating at a temperature of 400° F. After 15 minutes the stack was removed from the oven. The three layers of lasagne were firmly bonded together. The bonded lasagne product was very flexible, strong, soft and chewable. It was thinner than any practical layer of bonded linguini or fettuccine and stronger. It required an extremely little amount of the cellulose derivative highlighting its bonding strength.

The simple test also revealed that the effectiveness of cellulose derivatives as binding agents for cooked pasta is maximized by compressing cooked pasta pieces coated with an aqueous solution of a cellulose derivative and baking the compressed pasta under pressure to set the binding agent. Applicant's U.S. Pat. No. 5,960,705 teaches such a method of baking a mixture of cooked pasta pieces and a binder, and provides apparatus therefor.

The pasta composites usually include various ingredients, such as flour, salt, spices, cheese, etc. An ingredient that is particularly desirable for use with a cellulose derivative to bond pasta pieces together is starch which, like flour, serves to fill the interstices between the bonded pieces of pasta, and which contributes to the cohesion of the pasta pieces.

DESCRIPTION OF PREFERRED EMBODIMENTS

In its simplest embodiment, the invention involves mixing linguini cooked to an al dente condition, drained and cut to pieces about 2 inches long, with a 2% aqueous solution of methylcellulose (1500 centipoise grade). The amount of binding solution is just sufficient to wet the surfaces of the pasta pieces (methylcellulose is only about 1% of the weight of the cooked pasta). The pieces of binder-coated linguini, when tamped into a layer about one-half inch thick in an aluminum pan which is placed in an oven at 400° F., quickly become a unified but porous mass that can be served as a snack for dipping in salsas, cheese dips, etc. This example demonstrates the high bonding strength of the cellulose derivative, making it possible to use a very small amount.

An important use of cellulose derivatives pursuant to this invention is in the rapid production of pizza-shaped shells formed of cooked pasta, preferably linguini, spaghetti, fettuccine or noodles cut to pieces not exceeding about 3 inches in length, by compressing the pasta and a dissolved cellulose derivative and baking the mixture under pressure as illustrated in the aforesaid U.S. Pat. No. 5,960,705.

As an example of the invention carried out by baking cooked pasta admixed with an aqueous solution of a cellulose derivative under pressure, cooked pieces of fettuccine, about 2 inches long, with additions of 7.5% by weight of starch (Kol Guard sold by A.E. Staley Mfg. Co.), 1.2% of salt and 0.6% of garlic powder, are mixed with a 2% water solution of hydroxypropyl methylcellulose (4000 centipoise grade). The quantity of binder solution is controlled to make the cooked pasta flowable without excess binder solution that readily drains from the cooked pasta. The cellulose binder used is less than 2% of the weight of the cooked fettuccine. Placing and compressing the wet pasta mixture in a heated compression mold with a cavity shaped to form a pizza shell leads to the conversion of the wet mixture into a pizza-shaped shell at the end of a 35 second baking period at 450° F. The pizza shell formed of pasta has satisfactory cohesive strength and is sufficiently free of large pores that it can be garnished with tomato sauce without troublesome leakage of the sauce at the bottom of the shell that is about one-third inch thick. Baking the compressed pasta under pressure is essential to producing a pizza-shaped shell of satisfactory density (low porosity). Also, by baking the pasta pieces under pressure, the cellulose derivative exerts maximum cohesion when the pasta pieces are pressed closely together like a postage stamp on an envelope.

The pizza shell formed of the cooked pieces of fettuccine when trimmed with tomato sauce, shredded mozzarella, grated parmesan cheese and pepper, after being heated until the mozzarella melts, is a delightful food with a pleasing, unusual feel in the mouth. The cellulose gum in the pizza is both non-caloric and tasteless so that it does not impair the flavors of the condiments or the pasta shell.

While the preceding examples of the invention involve the use of high viscosity grades of cellulose derivatives, popularly referred to in the food industry as cellulose gums, low viscosity grades below 1500 centipoises may be used to form unified pasta products of lower cohesive strength or may be used in greater proportions to attain unified pasta products of increased strength. Cellulose gums are available in viscosity grades as low as 15 and 50 centipoises. High viscosity cellulose gums, defined to be at least 1500 centipoises for the purposes of this invention, are available in grades as high as 15,000, 40,000 and 100,000 centipoises. Hence, an additional advantage of using cellulose gums to form unified pasta products is the opportunity of blending different viscosity grades of different cellulose derivatives to form unified pasta products with modified characteristics such as texture, crispiness, springiness, and chewing quality. These opportunities of forming unique products of bonded pasta pieces were not afforded by invariable egg white.

The preceding examples involve mixing the cellulose gum with cooked pasta in the form of a 2% aqueous solution which is the specified solution concentration for grading cellulose gums. However, mixing any cellulose derivative with pasta may be carried out with an aqueous solution at any concentration other than 2% by weight. Working with a low viscosity gum, say 50 centipoise grade, a 3% or 4% water solution may be preferred. Conversely, in mixing pasta with a high viscosity gum, for example, 40,000 centipoise grade, a 1% water solution may facilitate uniform coating of every pasta piece by the dissolved gum.

The concentration of gum in the water solution will depend in each case on the viscosity grade of the selected cellulose derivative and other ingredients added to the pasta. For instance, if flour or starch is included in the product formulation, more water may be required than is available in a 2% solution of gum; in such case a 1% solution of the gum may be adequate for thorough mixing of all the ingredients, or without changing the 2% solution the required water is added directly to the pasta and other ingredients.

If a bulky, powdered ingredient, such as flour or starch, is used in the formula with cooked pieces of pasta, the cellulose gum need not be first dissolved in water before mixing with pasta and other ingredients. For example, if a formula calls for the use of starch at a weight 4 times that of the cellulose derivative, it is entirely practical to mix the starch and gum as dry powders and then disperse the mixture in enough water to yield a quantity of solution adequate for coating all the pieces of cooked pasta. Hence, the water-soluble cellulose derivative may be mixed with cooked pasta pieces in any way that dissolves the gum before it coats the pasta pieces.

It has been found that a small addition of food-grade glycerol or propylene glycol to the admixture of cooked pasta and cellulose derivative is an effective plasticizer in producing a less crispy or more supple pasta composite pursuant to this invention.

Variations and modifications of the invention will be apparent to those skilled in the art without departing from the spirit or scope of the invention. For example, a small amount of canola or olive oil can be used in the formulation without materially changing the bonding power of the cellulose gum. Accordingly, only such limitations should be imposed on the invention as are set forth in the appended claims.

What is claimed is:

1. A food composite formed of cooked pieces of pasta bonded together by a uniformly admixed minor weight proportion of an edible water-soluble cellulose derivative.

2. The food composite of claim 1 wherein the water-soluble cellulose derivative is selected from the group consisting of methylcellulose and hydroxypropyl methylcellulose.

3. The food composite of claim 2 wherein the cooked pieces of pasta with the admixed cellulose derivative were baked under compression to form a compact composite.

4. The food composite of claim 2 wherein the selected cellulose derivative has a viscosity grade of at least about 1500 centipoises.

5. The food composite of claim 4 which contains a small amount of food-grade glycerol or propylene glycol.

6. The food composite of claim 4 wherein the cooked pieces of pasta with the admixed cellulose derivative were baked under compression in a mold with a cavity contoured to yield the food composite in the shape of a pizza shell.

7. The food composite of claim 6 which, based on the weight of the cooked pieces of pasta, comprises not more than 10% by weight of flour and/or starch and not more than 5% by weight of the cellulose derivative.

8. The food composite of claim 7 which contains a small amount of food-grade glycerol or propylene glycol.

9. The food composite of claim 5 wherein the cellulose derivative is hydroxypropyl methylcellulose with a viscosity grade of about 4000 centipoises and the weight of said derivative is not more than 2.5% based on the weight of the cooked pieces of pasta.

10. The food composite of claim 6 which, based on the weight of the cooked pieces of pasta, comprises not more than 5% by weight of the cellulose derivative.

11. The improved process of converting cooked pieces of pasta into a food composite, which comprises mixing said cooked pieces of pasta with an aqueous solution of a minor weight proportion of an edible, water-soluble cellulose derivative, and baking the resulting wet mixture to form said food composite.

12. The process of claim 11 wherein the water-soluble cellulose derivative is selected from the group consisting of methylcellulose and hydroxypropyl methylcellulose, and the wet mixture is baked under compression to form a compact composite.

13. The process of claim 12 wherein the selected cellulose derivative as a powder is mixed with flour and/or starch before being dissolved with water.

14. The process of claim 12 wherein the selected cellulose derivative has a viscosity grade of at least about 1500 centipoises.

15. The process of claim 14 wherein a small amount of food-grade glycerol or propylene glycol is added to the wet mixture.

16. The process of claim 14 wherein the wet mixture is baked under compression in a mold with a cavity contoured to yield a food composite in the shape of a pizza shell.

17. The process of claim 16 wherein the selected cellulose derivative has a viscosity grade of about 4000 centipoises, and the cocked pieces of pasta are selected from the group consisting of linguini, spaghetti, fettuccine and noodles, said pieces being not longer than about 3 inches.

18. The process of claim 17 wherein a small amount of food-grade glycerol or propylene glycol is added to the wet mixture.

19. The process of claim 18 wherein the selected cellulose derivative as a powder is mixed with flour and/or starch before being dissolved with water.

20. The improved process of converting cooked pieces of pasta into a compact food composite, which comprises mixing said cooked pieces of pasta with an aqueous solution of edible, water-soluble cellulose derivative, said solution having a viscosity of at least about 1500 centipoises and containing not more than about 2% of said cellulose derivative, and baking the resulting wet mixture under compression to form said compact food composite.

21. The process of claim 20 wherein the aqueous solution contains methylcellulose and/or hydroxypropyl methylcellulose having a viscosity grade of about 4000 centepoises.

22. The process of claim 20 wherein the cellulose derivative as a powder is mixed with flour and/or starch before being dissolved in water.

23. The process of claim 20 wherein the cooked pieces of pasta are selected from the group consisting of linguini, spaghetti, fettuccini and noodles, the aqueous solution contains methylcellulose and/or hydroxypropyl methylcellulose, and baking the wet mixture under compression is conducted in a mold with a cavity contoured to yield a food composite in the shape of a pizza shell.

* * * * *